Dec. 4, 1951 R. N. WINFREE 2,577,220
PROCESS FOR RAISING DOUGH TEMPERATURES
Filed Aug. 27, 1945
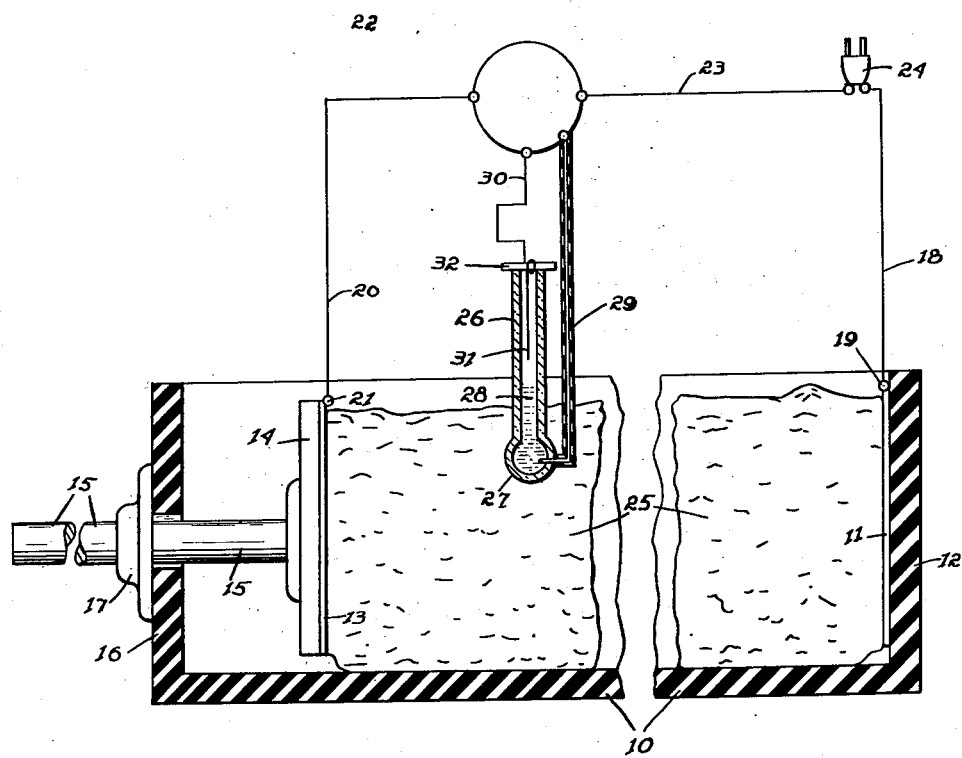
INVENTOR
R.N.Winfree
BY Arthur H. Sturges
ATTORNEY Patented Dec. 4, 1951

2,577,220

UNITED STATES PATENT OFFICE 2,577,220

PROCESS FOR RAISING DOUGH
TEMPERATURES

Robert N. Winfree, Omaha, Nebr.

Application August 27, 1945, Serial No. 612,817

4 Claims. (Cl. 107—54)

The present invention relates to a process for treating batches of dough or sponge in bread making.

It is an object of the invention to provide a method for processing bread dough whereby batches of mixed dough not of uniform temperatures, which have been mixed an equal amount of time as to each batch, are each raised to a selected and uniform degree Farenheit of temperature.

It is a particular object of the invention to provide a process for increasing the temperature of different batches of dough uniformly, whereby uniform fermentation and a consequent uniform product is resultant therefrom during a baking run of a plurality of said batches baked or treated separately.

As heretofore practiced, a primary difficulty in the commercial or large scale production of bread has been a loss of time and labor which has been occasioned resultant from differences of thermal conditions caused by changes in the weather and the like resulting in a lack of uniformity of the resultant product. Also during a mixing of bread doughs, especially where power machinery is employed for said mixing, friction and heat are generated by contact of the power operated mixing arms with bread doughs, whereby the temperature of the latter is gradually increased and since a batch of dough requires a certain amount of mixing time and the rate of increase of the temperature of a given batch of dough depends on the stiffness of the latter and to the degree of temperature applied to the mixing bowl by extraneous means such as refrigerating coils which are usually employed with said bowls, whereby the quality of the loaves derived from different batches of dough is not uniform.

Also during a "run" of several batches of dough, room temperatures may change and vary between the mixture of a batch and a subsequent batch of the run. A further reason for variations between batches of a run is that the workman may not accurately proportion the ingredients or provide the same kneading treatment to each batch. Also, there often are differences in the flour derived from different bins of a large commercial bakery, whereby one batch of flour will provide a more glutinous mixture with respect to a subsequent batch, said glutinous content affecting the temperature of the batch correspondingly by changing the consistency of the dough. The glutinous content of flours varies accordingly and with respect to the wheat from which the flour is derived since "hard" wheat provides a different glutinous content than what is known as "soft" wheat.

It is also well known that the quality and quantity of gluten in a bread dough governs the capacity of the dough to retain the gas which causes the dough to expand during a baking thereof into loaves of bread and that a difference in temperature of a batch of dough causes a corresponding difference in the time required for fermentation of the batch since one degree in temperature of said batch will usually result in a difference of fifteen minutes in the time required for fermentation.

Also, as heretofore practiced, a workman applies different mixing times to different batches of dough in accordance with his judgment as to the proper length of time, whereby the human factor is involved and the latter provides variables since the workman's calculations consist partially of guess as well as an employment of good judgment, whereby bread doughs are either undermixed or overmixed in an attempt to provide bread doughs of a uniform temperature for procuring a uniform product therefrom, and the present invention aims to obviate certain of the undesirable features of the prior practice.

The single figure of the drawing depicts a longitudinal vertical section of a bread dough trough embodying the present invention.

Referring now to the drawing for a more particular description, 10 indicates a trough in which a batch of bread dough is placed during a fermentation of the dough.

The trough 10 is formed of any suitable electrically insulating material or is lined with the latter, whereby short circuits are prevented during a later described use thereof.

At one end of the trough 10, an electrode 11 is provided formed of any suitable conductor of electricity such as copper or the like. Preferably the electrode 11 is approximately the same area in plan as the end wall 12 of the trough, being disposed against the latter or secured thereto.

A similar electrode is indicated at 13, being disposed adjacent the other end of the trough with respect to the electrode 11, said electrodes, in substance, comprising a pair thereof.

Preferably, the electrode 13 is adjustable longitudinally of the trough for use during a treating of a partial batch of bread dough at the end of a run of batches. The electrode 13 is preferably attached to a disc of insulation 14 and the latter is secured to a shaft 15. The shaft extends through the end wall 16 of the trough and a bearing flange or the like 17 is provided, whereby an operator may manipulate the shaft 15 for causing the electrode 13 to be disposed any selected distance away from the electrode 11 that is complemental to the size of a batch of dough to be treated, since the shaft 15 is approximately as long as the trough 10.

An insulated wire 18 is in electrical communication, as at 19, with the electrode 11 and a similar wire 20 is similarly connected to the electrode 13, as indicated at 21.

The wire 20 is in communication with a thermostat switch, the latter being generally indicated at 22, and since said switch is of conventional construction, it is believed not to require any particular description or illustration herein.

An insulated wire 23 is employed, having an end which is also in electrical communication with the switch 22. The wires 18 and 23 are electrically connected to a push-in plug 24.

At times when the plug 24 is disposed in electrical communication with a source of electrical energy, such as a 110 volt circuit, and at times when the switch 22 is in a normal closed position, it will be seen that an electrical circuit is thereby closed between the electrodes 11 and 13 and through the mass of dough 25 within the trough 10 since said hydrate dough is in contact with both of said electrodes as shown in the drawing.

The invention further includes a means for causing the above described electrical circuit to become open responsive to the temperature of the mass of dough 25 attaining a certain selected degree of heat resultant from current flowing through said mass.

The preferred means for actuating the switch 22 for opening the above described circuit includes a thermometer indicated at 26.

The member 26 may be of simple construction as shown in the drawing, including an elongated glass tube, the latter being provided with a sump 27 at the closed end thereof. Within the globular shaped sump, a quantity of mercury 28 is provided. The interior of the sump and said mercury is in electrical communication with a wire 29. The wire 29 exteriorly of the sump is insulated by any suitable material since, as later described, said wire is manually forced downwardly into the mass of dough 25 at desired times. The other end of the wire 29 is in electrical communication with the thermostat switch 22.

A further wire 30 is employed, having one of its ends disposed in electrical communication with the thermostat switch 22 and its other end 31 disposed within the glass tube of the thermometer 26.

A suitable means is provided for selectively disposing the end 31 of the wire 30 further away from or closer toward the sump of the thermometer than is shown in the drawing and said means may include a detent 32 which is disposed across the open end of the thermometer tube. By wrapping the wire 30 about the detent 32, the operator may regulate the distance of the end 31 of the wire 30 with respect to the mercury within the tube 26.

At times when the temperature of the dough 25 is to be raised to a certain degree Farenheit, the operator disposes the end 31 out of contact with the mercury within the tube a sufficient distance away from said mercury so that at the time the mercury expands, resultant from the heat applied by the mass of dough 25, and said mercury ascends in said tube, the mercury will contact with the end 31 of the wire 30 at the time the mass of dough 25 is of the temperature selected. The usual time required for the electrical treatment of conventional batches of dough is from one to ten minutes in accordance with conditions. In order to facilitate an adjustment of the end 31 of the wire 30, a scale, not shown, is etched or otherwise suitably applied on the transparent glass tube.

It will be seen that, as described, the operator may manipulate the device and so dispose the end 31 of the wire 30 that at times when the mercury ascends and contacts said end 31, a circuit will be closed through the wires 29 and 30 and said mercury for so actuating the thermostat switch 22 that the above described circuit through the wires 18 and 20 and the dough 25 becomes open for cutting off the supply of heat applied to the dough 25 by said electrical energy.

During a production of bread, an operator assembles the conventional ingredients from which the bread is made in a mechanical dough mixer, including water, flour, yeast and the like and in desired proportions, then causes the mass to become admixed the selected length of time necessary to develop the gluten of the mass to its maximum extent and his objective is that the dough does not become either overmixed or undermixed. Assuming that the operator desires to provide the mass of dough 25 with a uniform temperature of 76 degrees and he desires a twelve minute mixing period for said mass, he regulates the temperature of the dough mixer machine, as to the jacket of the latter, so that when the dough has been mixed the desired twelve minutes, the resulting temperature of the dough will be below the selected 76 degree temperature later desired for the mass.

It is an essential step of the method that prior to treating each batch of dough by the new means that the temperatures of the several batches of dough be lowered below the selected 76 degrees, during an admixing thereof, so that all batches of a run will become of a uniform temperature, by raising each batch separately to the selected 76 degrees Fahrenheit by causing an electrical current to pass through the batch for a few minutes until said batch has attained the said selected degree.

It will be obvious that the above described process is equally operative with respect to sponge dough and straight dough.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for treating batches of dough or sponge in bread making prior to fermentation which comprises mixing the ingredients for each batch of dough for a definite length of time which is uniform for each individual batch of a series of batches at a temperature below a desired temperature, removing each batch of dough from the mixer and immediately raising the temperature of every portion of each batch of dough simultaneously to the desired temperature which is the same for each batch of the series, whereby each batch of the series will start its fermentation period at the desired temperature.

2. A process according to claim 1, in which each batch of dough is electrically heated to the desired uniform temperature by the internal resistance of the dough and which is automatically cut off when the desired temperature is reached in each batch.

3. A process according to claim 1, in which the step of raising the temperature of each batch of dough to the desired temperature is carried out by subjecting each batch to electric energy with each batch of dough being placed between two spaced electrodes to expose the batches to the electric current flowing between the electrodes and through the dough.

4. A process for treating successive batches of dough or sponge in bread making prior to fermentation which comprises the steps of mixing the ingredients for each batch of dough at a temperature below a desired temperature, removing each batch of dough from the mixer and immediately raising the temperature of every portion of each batch of dough simultaneously to the desired temperature which is the same for each batch, whereby each batch will start its fermentation period at the desired temperature.

ROBERT N. WINFREE.

REFERENCES CITED

The following references are of record in the file of this patent:

| Number | Name | Date |
| --- | --- | --- |
| 1,380,656 | Lauth | June 7, 1921 |
| 1,522,188 | Hull | Jan. 6, 1925 |
| 1,754,574 | Sater | Apr. 15, 1930 |
| 1,900,573 | McArthur | Mar. 7, 1933 |
| 1,919,050 | Warner | July 18, 1933 |
| 2,023,478 | Kremer | Dec. 10, 1935 |
| 2,054,756 | Kremer | Sept. 15, 1936 |
| 2,054,937 | Kremer | Sept. 22, 1936 |
| 2,139,690 | McConnell et al. | Dec. 13, 1938 |
| 2,149,538 | Morton | Mar. 7, 1939 |
| 2,253,770 | Duffy, Jr. | Aug. 26, 1941 |
| 2,257,487 | Tenney | Sept. 30, 1941 |
| 2,274,220 | Sticelber | Feb. 24, 1942 |
| 2,340,354 | Wells | Feb. 1, 1944 |
| 2,370,888 | Sticelber | Mar. 6, 1945 |
| 2,413,003 | Sherman | Dec. 24, 1946 |